Patented May 17, 1932

1,859,015

UNITED STATES PATENT OFFICE

ALAN R. ALBRIGHT, OF PITTSBURGH, PENNSYLVANIA, ASSIGNOR TO THE KOPPERS COMPANY, A CORPORATION OF DELAWARE

TREATMENT OF HYDROCARBON OIL PRODUCED IN GAS MANUFACTURE

No Drawing. Application filed October 10, 1928. Serial No. 311,714.

The present invention relates to the manufacture or preparation of fuel gas, such as coke oven gas, coal gas and the like, for consumption, and particularly to the treatment of by-products and other materials obtained in the course of such manufacture or preparation, such as hydrocarbon oil.

An object of my invention is to provide a method of combining various steps in the preparation of fuel gas in such manner as to materially reduce the amount of certain reagents necessary in the various stages of such preparation.

A further object of my invention is to provide a method of eliminating undesirable materials from fuel gas or from its by-products or waste materials recovered in the manufacture or preparation of fuel gas that shall be economical and otherwise advantageous with respect to the amount and utility of the reagents required for such preparation.

A further object of my invention is to provide an improved method of and materials for treating hydrocarbon oil such as that obtained as a by-product in the manufacture of fuel gas.

A still further object of my invention is to provide a method whereby the efficiency of various steps in the manufacture or preparation of fuel gas may be increased.

My invention has for further objects such other operative advantages or results as are hereinafter found to be obtained.

In the manufacture or preparation of fuel gas, such as coke oven gas or the like, there are a number of well known steps which are performed either by reason of the value of by-products recovered thereby or for the purpose of removing undesirable constituents from the gas itself, from by-products recovered therefrom, or from waste materials which are necessarily produced during the course of preparation of the gas.

The steps with which the present invention is concerned are particularly the removal of tar acid such as phenol from the waste liquor from the ammonia still and the recovery of hydrocarbon oil such as benzol, motor fuel and the like from the gas.

With respect to dephenolization of the still waste, it is well known that modern legislation and public welfare in many cases prohibit the discharge of plant effluent into streams and the like in such condition or amount as to contaminate such streams or other sources of water supply with tar acid.

A number of processes have been developed for the treatment of still waste or ammonia liquor in order to eliminate tar acid therefrom prior to discharging the treated waste into streams or elsewhere. In the majority of these processes, and in fact practically all which give promise of ever obtaining commercial success, the procedure comprises principally removing the tar acid from the ammonia liquor or the still waste by a suitable transfer medium, such as a liquid extraction agent or a gas, preferably repeatedly used in a cycle of some sort which also comprises means for in turn removing the tar acid from the liquid agent or gaseous transfer medium.

The means most commonly employed for stripping the transfer agent of tar acid comprises a solution of a suitable alkali, for example, sodium hydoxide. When sodium hydroxide is used, the phenols are absorbed as sodium phenolates. The sodium phenolate may subsequently be "sprung", i. e., treated for the liberation of the phenols from the alkali by any suitable means, such as acidification with carbon dioxide or the like.

Among the factors which play an important part in the success of such a process is the cost of the alkali required for this purpose. It is to be borne in mind that in many instances the dephenolization of still waste is primarily a nuisance operation and the salability of the recovered phenols may often be uncertain. This fact tends to exaggerate the cost of any material required in the process.

It has also been observed that in many instances in which the above type of process is used the amount of phenols carried by the transfer agent and which have been removed therefrom is subject to considerable variation. For example, it has been found that in one installation the phenol in the alkaline liquor about to be dephenolized varies from 0.3 to 3.0 grams per liter of phenol, and consequently the phenol content of the transfer agent, whether liquid or gaseous, varies accordingly.

Consequently it is found extremely desirable to use a considerable excess of alkali in the stripping stage, i. e. the stage in which the phenol originally removed from the liquor is in turn removed from the transfer agent, in order to insure that the removal in both stages of the process will be efficient and complete. In general, it is found desirable to maintain an excess of approximately 100% of the alkaline reagent over that required to react with the phenol. When this is done the liquid leaving the stripping stage contains approximately equal amounts of sodium hydroxide and sodium phenolate.

The above condition would be expensive under ordinary conditions of practice in view of the increase in the amount of sodium hydroxide required for the process. However, as will be shown hereinbelow, I have discovered that this material can be used to advantage in other stages of the preparation of the gas and by-products and, in fact, to such advantage that the cost of alkali for dephenolization purposes may be substantially reduced to zero.

In the second stage of preparation mentioned hereinabove, i. e. the removal of hydrocarbon oil from the gas, it is well known that the crude light oil as first removed from the coal gas and liberated from the extraction medium contains impurities which must be removed prior to the use of the material as motor fuel, or prior to the separation of the crude material into its constituents, benzol, toluol, xylol and the like, in pure form. Such impurities comprise principally unsaturated organic compounds and it is general practice to effect the removal of these materials or these impurities by treating the crude oil with an agent, usually concentrated sulphuric acid, whereby these impurities may be polymerized and removed in the form of a sludge. After this acid treatment it is necessary to remove from the oil certain acidic materials which are formed in the acid treatment, and comprising principally sulphonic acids.

For the purpose of removing sulphonic acids and similar materials, the oil is treated with an alkali, usually a solution of sodium hydroxide.

I have discovered that the spent or partially spent liquid from the dephenolization stage above described constitutes an effective and even an improved agent for treating the crude oil subsequent to the acid treatment.

Moreover, under normal conditions, when the above recited desired excess of alkali is employed in the dephenolization stage, I have found that the amount of spent liquid leaving the dephenolization stage is approximately equal to the amount required for the treatment of the hydrocarbon oil.

I have also found that the solution of sodium phenolate, whether or not additional alkali is present, constitutes an improved washing medium for the oil by reason of the fact that the oil, subsequent to treatment with this material, is of improved quality with respect to color as compared with treatment in the usual manner with a solution of sodium hydroxide.

While I do not attempt to explain this phenomenon in detail, it may be pointed out that it is known that sodium phenolate has certain unusual properties, among which may be mentioned that it is hydrotropic, i. e. that an aqueous solution thereof is capable of absorbing various materials which would be insoluble in the aqueous medium alone and that this property of hydrotropism of the sodium phenolate extends particularly toward various materials related to benzol and other constituents of the hydrocarbon oil. It is thus logical to suppose that the sodium phenolate solution is capable of removing from the hydrocarbon oil various materials not ordinarily removed, and which under other circumstances tend to impart to the treated oil an undesirable dark color when not so removed.

Under the conditions above referred to, i. e. when a suitable excess of alkali is employed in the dephenolization stage, the solution of sodium phenolate or the solution of a mixture of free alkali and sodium phenolate coming from the dephenolization stage constitutes an improved reagent for the treatment of hydrocarbon oil. The latter solution may contain sufficient free alkali to provide for the neutralization of sulphonic acid and other impurities in the oil without decomposing the sodium phenolate also contained in the washing liquid.

However, it is not essential that the washing liquid contain sufficient free alkali to react with all of the undesirable materials in the oil. If no free alkali is present or after the free alkali is entirely consumed the sodium phenolate itself, or a portion thereof, will react with the sulphonic acids and similar impurities. While phenol may be liberated by this reaction, this does not constitute a disadvantage of the present invention by reason of the fact that the boiling point of the liberated phenol is so much higher than those of the benzols, that the latter are substantially completely separated therefrom in the distillation stage. Furthermore, even if a small amount of phenol is contained in the benzols, particularly when the latter are used as motor fuel, it is not necessarily a disadvantage, by reason of the fact that phenol is known to possess anti-knock properties desirable in motor fuels.

In order that the washing operation may be fully set forth and understood, a typical instance will now be described.

The hydrocarbon oil is removed from the gas as is well known by absorption in a suitable wash oil and is then in turn removed from the wash oil by steam distillation and condensed. The crude light oil condensate is then washed with about 7% by volume of concentrated sulphuric acid and the resultant acid sludge is decanted and removed. The acid washing stage may be followed if desired by water washing, but ordinarily this latter washing stage is omitted.

The oil is then washed with the solution containing a mixture of sodium hydroxide and sodium phenolate or with the solution of sodium phenolate alone, as the case may be. For this purpose from 0.04 to 0.08 lbs. of sodium hydroxide or its molecular equivalent in sodium phenolate per gallon of light oil washed is required. The washing liquid layer is then decanted and removed to be used or treated as will be shown hereinbelow and the light oil may be washed with water if desired or sent directly to the distillation stage.

The above is a representative instance, but it will be understood that under certain conditions the nature of the crude light oil will require variations in the amounts of acid and alkali required for the washing treatment and in any case the operator is governed by a consideration of the chemical reactions and requirements involved.

The alkaline washing liquid leaving the washing stage may or may not contain excess sodium hydroxide but in any event contains a substantial amount of sodium phenolate. This liquid may be advantageously used for the removal of acidic impurities from fuel gas.

When it is desired to recover the phenols, the washing liquid containing sodium phenolates may then be treated with a suitable agent to cause the liberation and separation of the phenols. For example, sodium bicarbonate may be employed to liberate the phenol from the sodium phenolate and the resultant solution may be employed for any suitable process, or discarded, as the case may be.

It will be apparent from the above that whereas separate and additional amounts of alkali were necessary in each of the operations of the preparation of the gas and its by-products referred to hereinabove, according to the present invention, the same alkali may be employed successively in each of these operations with the result that the alkali required for either of these operations is obtained at substantially no cost by reason of the fact that it is necessarily required by the other operation.

It will further be apparent that according to my invention the efficiency of each of the operations or stages referred to may be considerably enhanced or the quality of the product improved and consequently the process of my invention represents a distinct and highly advantageous improvement in the art of the preparation of fuel gas and working up of its by-products.

My invention is not confined to any particular type of either of the processes referred to. For example, it may be employed to advantage with any of the numerous dephenolization processes of the type referred to hereinabove, such as the benzol extraction process, or a process in which the ammonia liquor is treated by means of gas or by means of steam distillation for the removal of phenol.

Moreover, my invention is not limited to the use of any specific alkaline material although sodium hydroxide is described as the specific example by reason of the fact that it is the agent most commonly employed for analogous operations.

Moreover, while I describe my invention above with respect to certain specific illustrative examples it is not limited to such, but may be variously practiced within the scope of the claims hereinafter made.

I claim as my invention:—

1. In the manufacture of fuel gas, the steps which comprise transferring tar acid originally contained by the gas to a solution of an alkali, and employing the resultant solution for the treatment of hydrocarbon light oil removed from the gas.

2. In the manufacture of fuel gas, the steps which comprise treating the gas with an aqueous liquor to remove ammonia and tar acid therefrom, transferring said tar acid from said liquor to a transfer agent, removing said tar acid from said transfer agent by means of an alkaline solution, and employing the resultant solution for the treatment of hydrocarbon light oil removed from the gas.

3. In the manufacture of fuel gas, the steps which comprise treating the gas with an aqueous liquor to remove ammonia and tar acid therefrom, transferring said tar acid from said liquor to a transfer agent, removing said tar acid from said transfer agent by means of an alkaline solution containing sufficient alkali to provide an excess over the average amount required to react with said tar acid sufficient to insure substantially complete removal of tar acid from said transfer agent at all times, and employing the resultant solution for the treatment of hydrocarbon light oil removed from the gas.

4. In the manufacture of fuel gas, the steps which comprise treating the gas with an aqueous liquor to remove ammonia and tar acid therefrom, transferring said tar acid from said liquor to a transfer agent, removing said tar acid from said transfer agent by means of an alkaline solution containing an excess of alkali, and employing the resultant solution for the treatment of hydrocarbon light oil removed from the gas and previously washed with sulphuric acid, said excess being sufficient to provide sufficient free alkali in said solution after treatment of said transfer agent to react with the undesirable constituents of said hydrocarbon light oil remaining after the acid washing stage, and to insure substantially complete removal of tar acid from said transfer agent at all times.

5. In the manufacture of fuel gas, including the steps of removing tar acid from the gas liquor and removing hydrocarbon light oil from the gas, the step which comprises employing a solution of an alkaline successively for the reception of tar acid removed from said gas liquor and for the removal of undesirable constituents from said hydrocarbon light oil.

6. In the manufacture of fuel gas, including the steps of removing tar acid from the gas liquor and removing hydrocarbon light oil from the gas, the step which comprises employing a solution of an alkali successively for the reception of tar acid removed from said gas liquor and for the removal of undesirable constituents from said hydrocarbon light oil, the amount of alkali used in the first instance being sufficient to satisfy the full requirements of that and subsequent uses.

In testimony whereof I have hereunto subscribed my name this 9th day of October, 1928.

ALAN R. ALBRIGHT.